United States Patent [19]
Patel et al.

[11] Patent Number: 5,805,053
[45] Date of Patent: Sep. 8, 1998

[54] APPLIANCE ADAPTED FOR POWER LINE COMMUNICATIONS

[75] Inventors: Chandrakant Bhailalbhai Patel, Hopewell; Jack Rudolph Harford, Flemington, both of N.J.; Glenn Seggern, Springfield, Pa.

[73] Assignee: Elcom Technologies, Inc., King of Prussia, Pa.

[21] Appl. No.: 734,361

[22] Filed: Oct. 21, 1996

[51] Int. Cl.⁶ .................................................. H04M 11/04
[52] U.S. Cl. ............................. 340/310.01; 340/310.02; 340/310.06
[58] Field of Search ........................ 340/310.01, 310.02, 340/310.06, 310.07, 310.08, 286.01, 286.02; 379/61, 62, 64, 66; 455/402

[56] References Cited

U.S. PATENT DOCUMENTS

| | | |
|---|---|---|
| 3,400,221 | 9/1968 | Wolters . |
| 3,846,638 | 11/1974 | Wetherell .......................... 340/310.07 |
| 3,949,172 | 4/1976 | Brown et al. .............................. 379/66 |
| 4,058,678 | 11/1977 | Dunn et al. ........................ 340/310.07 |
| 4,377,804 | 3/1983 | Suzuki ................................ 340/310.02 |
| 4,475,193 | 10/1984 | Brown ................................. 340/310.01 |
| 4,479,033 | 10/1984 | Brown et al. .............................. 379/66 |
| 4,495,386 | 1/1985 | Brown et al. .............................. 379/66 |
| 4,509,211 | 4/1985 | Robbins et al. ........................ 359/145 |
| 4,514,594 | 4/1985 | Brown et al. ...................... 340/310.01 |
| 4,523,307 | 6/1985 | Brown et al. .............................. 379/66 |
| 4,701,945 | 10/1987 | Pedigo ..................................... 379/66 |
| 4,885,563 | 12/1989 | Johnson et al. .................... 340/310.06 |
| 4,980,665 | 12/1990 | Schotz ................................. 340/310.07 |
| 5,210,519 | 5/1993 | Moore ................................. 340/310.07 |
| 5,455,467 | 10/1995 | Young et al. ....................... 340/310.07 |
| 5,530,737 | 6/1996 | Bartholomew et al. .................. 379/62 |
| 5,533,101 | 7/1996 | Miyagawa ................................. 379/61 |
| 5,574,653 | 11/1996 | Coomer et al. ......................... 364/483 |

FOREIGN PATENT DOCUMENTS

| | | | |
|---|---|---|---|
| WO 94/09572 | 4/1994 | WIPO .............................. H04B 3/54 |
| WO 96/08892 | 3/1996 | WIPO .............................. H04J 3/02 |

*Primary Examiner*—Brent A. Swarthout
*Assistant Examiner*—Van T. Trieu
*Attorney, Agent, or Firm*—Ratner & Prestia

[57] ABSTRACT

An electrical appliance in which a power line adapter unit is embodied by which information signals are conducted to and from a power line from and to the appliance along the same connection to the power line by which the appliance is powered.

10 Claims, 2 Drawing Sheets

APPLIANCE ADAPTED FOR POWER LINE COMMUNICATIONS

TECHNICAL FIELD

The present invention relates, in general, to the communication of information along the power lines of a building and, in particular, to the adaptation of appliances for the transmission to and reception from the power lines of the information conducted along the power lines.

BACKGROUND OF THE INVENTION

More and more interest is developing in the transmission of information along the power lines of a building. Currently, equipment is available for transmitting television, telephone, audio and computer signals along the building power lines instead of by dedicated wirings for the particular functions.

In such arrangements, a first unit is plugged into an electrical outlet and an information signal is conducted from a source of the information signal through the first unit to the power line and transmitted to a second unit where it is received and conducted through the second unit to a utilization unit where it is used. For example, for the transmission and reception of television signals, the first unit is positioned at the entry into the building of a cable or antenna wire input and the input television signal is conducted to the power line through the first unit and transmitted along the power line to the second unit where it is received and conducted by the second unit to the television set for viewing.

At the present time, two pieces of equipment, which are separately manufactured, are plugged into outlets at a particular location where the information signal is being conducted to or from the power line. One is the appliance which is the source or receiver of the information signal (e.g. television set, computer, stereo, cable box, telephone) and the other is the power line communications (PLC) adapter which receives the information signal from the appliance or the power line and conducts it to the power line or the appliance. The appliance is connected to the power line to receive power and the PLC adapter is connected to the power line to receive power and conduct the information signal to or from the power line.

It can be expected that, in the future, appliance manufacturers will manufacture certain of their appliances embodying the PLC adapter so that only one unit, namely the appliance with the PLC adapter embodied, will be plugged into the power line. Such units can be characterized as "PLC ready." The two parts of such units (i.e. the appliance portion and the PLC adapter portion) will be powered by a common connection to the power line and the information signal will be conducted to or from the appliance through the PLC adapter and to and from the power line along the same connection to the power line.

Every appliance that is connected to a power line must be arranged so that it does not "inject" into the power line signals that are objectionable to government regulations. In the United States, FCC Part 15 defines these restrictions based on the class of appliance and its manner of operation. For example, for television sets, signal frequencies within the television set should not be "injected" into the power line. Television sets generate dc power supply voltage from horizontal frequency based oscillators, with many having switching power supplies with a switching frequency in the range of 100 kHz, 200 kHz or higher which must not reach the power line to which the television set is connected.

To meet these requirements, filters, commonly called "line filters," are built into the appliance and disposed between the power line and the power supply of the appliance and other circuits in the appliance. There are a number of varieties of these filters, the most common being a "bypass" capacitor, usually 0.22 $\mu f$, across the high to neutral, high to ground and/or neutral to ground terminals. This bypass capacitor prevents relatively high frequency signals within the television set from reaching the power line. There is some circuitry ahead of this "bypass" capacitor which provides somewhat higher impedance to high frequencies, but significant leakage, which exceeds government regulations, still can occur. The "bypass" capacitor prevents such leakage to the power line.

It is common practice to include surge protecting circuitry in electrical appliances. Such surge protecting circuitry presents a low impedance path between the high and neutral or ground terminals. A low impedance path between the high and neutral terminals will be common to a signal path to and from the power line for the PLC adapter portion of the appliance when the appliance is PLC ready with the PLC adapter embodied in the appliance. This will result in attenuated or reduced signal input to and/or received from the power line. For example, for a PLC ready cable box, this can affect the cable television signals conducted to the power line for transmission along the power line to a television set for viewing at a remote location. For PLC ready television sets, this can affect the television signals conducted from the power line to the television set and a remote control signal conducted from the television set to the power line for transmission along the power line to a tuner for channel selection at a remote location. For PLC ready computers, this can affect the computer signals conducted to the power line for transmission along the power line to another computer at a remote location and the signals conducted from the power line to a computer. The same undesired attenuation or reduction in signal strength can occur for other PLC ready appliances such as telephones and stereos.

SUMMARY OF THE INVENTION

An electrical appliance adapted for conducting information signals to or from the appliance from or to a power line, constructed in accordance with the present invention, includes, in a first form of the invention, means for conducting information signals to a power line and, in a second form of the invention, means for conducting information signals from a power line.

Included in the first form of the present invention are a source for supplying information signals and having a power supply and a power line adapter unit having a power supply and information signal transmitting means for conducting information signals from the source to a power line. The first form of the present invention also includes a power line connector for connecting the power supply of the source, the power supply of the power line adapter unit, and the information signal transmitting means to a power line. The first form of the present invention further includes means for preventing information signals from the information signal transmitting means from being conducted to the source along the power line connector.

Included in the second form of the present invention are a utilization unit for using information signals and having a power supply and a power line adapter unit having a power supply and information signal receiving means for conducting information signals from a power line to the utilization unit. The second form of the present invention also includes a power line connector for connecting the power supply of the utilization unit, the power supply of the power line adapter unit, and the information signal receiving means to a power line. The second form of the present invention further includes means for preventing information signals from a power line from being conducted directly from a power line to the utilization unit.

DETAILED DESCRIPTION OF THE INVENTION

Figure 1:
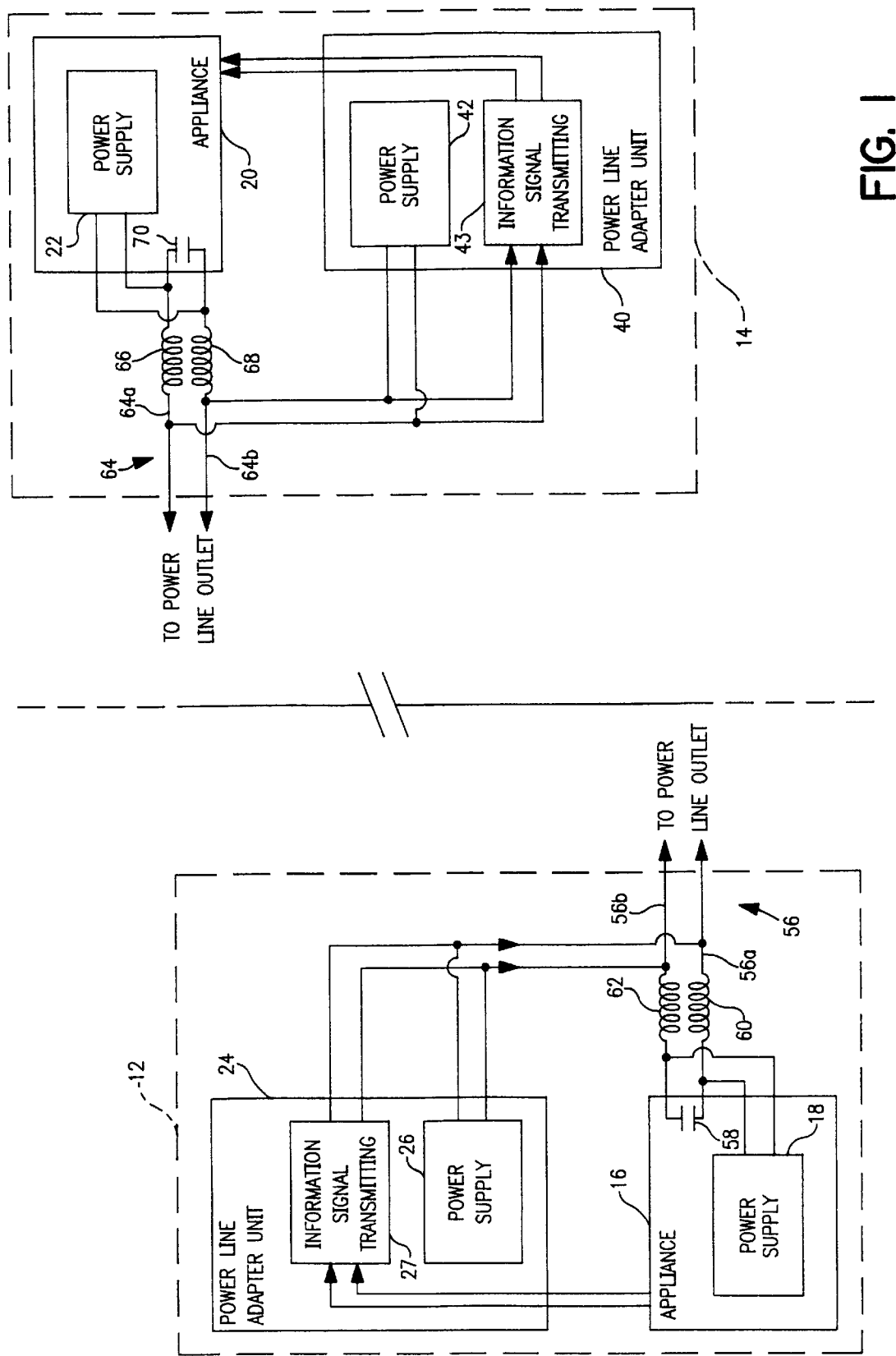
FIG. 1 is a circuit diagram of a power line communications system constructed in accordance with the present invention and having both forms of an electrical appliance constructed in accordance with the present invention.

Referring to FIG. 1, a power line communications system, constructed in accordance with the present invention and having both forms of an electrical appliance constructed in accordance with the present invention, includes a power line 10, means, identified by reference numeral 12, for conducting information signals to a power line, and means, identified by reference numeral 14, for conducting information signals from a power line. The source of the information signals is a first appliance 16, such as a television cable box, which has a power supply 18. The utilization unit of the information signals is a second appliance 20, such as a television set, which has a power supply 22.

Figure 2:
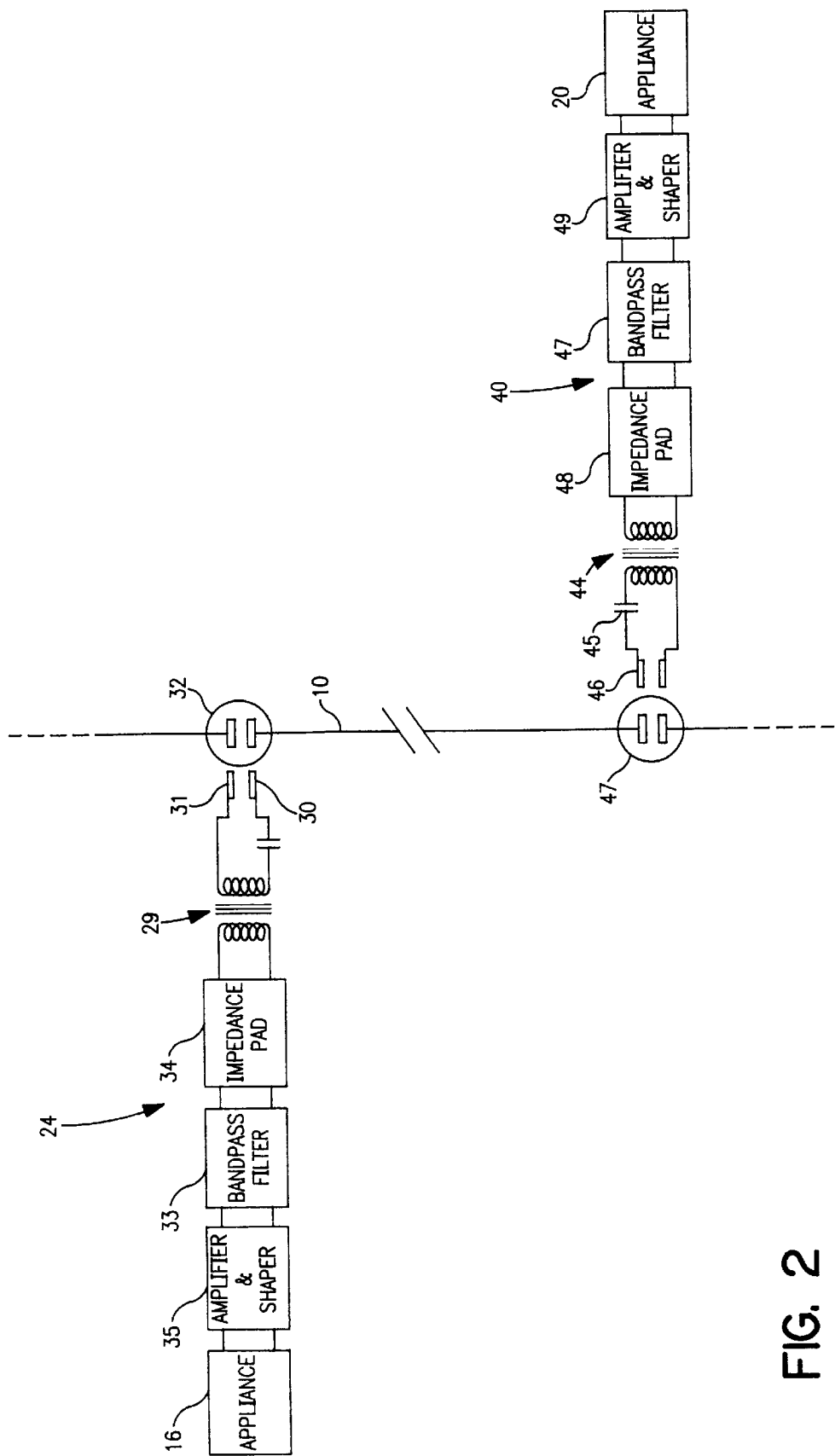
FIG. 2 is a block diagram of the power line adapter units shown in FIG. 1.

Associated with first appliance 16 is a first power line adapter unit 24 having a power supply 26 and information signal transmitting means 27 for conducting information signals from the first appliance to power line 10. As shown in FIG. 2, power line adapter unit 24 includes a ferrite core coupler 29 for isolating information signal transmitting means 27 from power line 10. Coupler 29 also couples information signals from information signal transmitting means 27 to power line 10. Coupler 29 functions as a signal transformer and preferably is arranged to exhibit a sharp roll off below a frequency of 1 MHz, thereby attenuating interference from power line frequency 60 Hz in the United States and harmonics of the power line frequency. The ferrite material is selected for the frequency range of operation, namely the nature and character of the information signals.

The design parameters of ferrite core coupler 29 include the size and material of the bead or core and the number of turns. Usually, a bifilar wire is used, thereby providing close coupling between the input and the output. A capacitor 30 and a plug 31 connect coupler 29 to power line 10 by way of an outlet 32 which is connected to the power line.

Information signal transmitting means 27 also include a band pass filter 33 for selectively passing information signals from first appliance 16 to power line 10. Bandpass filter 33 is designed to provide minimal distortion at the frequencies of interest and attenuate out-of-band noise and interference to information signal transmitting means 27. Specific traps also can be designed to reject known interfering signals to improve system performance.

Information signal transmitting means 27 further include an impedance matching pad 34 for minimizing mismatches between the impedance of bandpass filter 33 and the impedance at outlet 32 connected to power line 10 and to which information signal transmitting means 27 are connected. A power line, for example from outlet 32 to another outlet, presents different loads at different times in a power line communications system. Impedance pad 34, placed between coupler 29 and bandpass filter 33, alleviates the effect of wide variations of impedance mismatches between power line 10 and bandpass filter 33, while retaining the frequency response characteristics of bandpass filter 33.

Information signal transmitting means 27 preferably include amplifier and shaper means 35, disposed between first appliance 16 and bandpass filter 33, for amplifying and shaping the information signals supplied to information signal transmitting means 27 from first appliance 16.

Coupler 29, bandpass filter 33, and impedance pad 34 form a coupling circuit which allows the selection of a desired band of frequencies for signal transmission to the desired degree of selectivity for a given application. For example, in television transmissions, the signal bandwidth is at least 6 MHz.

Associated with second appliance 20 is a second power line adapter unit 40 having a power supply 42 and information signal receiving means 43 for conducting information signals from power line 10 to the second appliance. As shown in FIG. 2, power line adapter unit 40 includes a ferrite core coupler 44 for isolating information signal receiving means 43 from power line 10. Coupler 44 also couples information signals from power line 10 to information signal receiving means 43. Like coupler 29, coupler 44 functions as a signal transformer and preferably is arranged to exhibit a sharp roll off below a frequency of 1 MHz, thereby attenuating interference from the power line frequency and its harmonics. Again, the ferrite material is selected for the frequency range of operation, namely the nature and character of the information signals.

As with coupler 29, the design parameters of ferrite core coupler 44 include the size and material of the bead or core and the number of turns. Usually, a bifilar wire is used, thereby providing close coupling between the input and the output. A capacitor 45 and a plug 46 connect coupler 44 to power line 10 by way of an outlet 47 which is connected to the power line.

Information signal receiving means 43 also include a band pass filter 47 for selectively passing information signals from power line 10 to second appliance 20. As with bandpass filter 33, bandpass filter 47 is designed to provide minimal distortion at the frequencies of interest and attenuate out-of-band noise and interference to information signal receiving means 43. Again, specific traps also can be designed to reject known interfering signals to improve system performance.

Information signal receiving means 43 further include an impedance matching pad 48 for minimizing mismatches between the impedance of bandpass filter 47 and the impedance at outlet 47 connected to power line 10 and to which information signal receiving means 43 are connected. As indicated above, a power line, for example from outlet 47 to another outlet, presents different loads at different times in a power line communications system. Impedance pad 48, placed between coupler 44 and bandpass filter 47, alleviates the effect of wide variations of impedance mismatches between power line 10 and bandpass filter 47, while retaining the frequency response characteristics of bandpass filter 47.

Information signal receiving means 43 preferably includes amplifier and shaper means 49, disposed between second appliance 20 and bandpass filter 47, for amplifying and shaping the information signals supplied to information signal receiving means 43 from power line 10.

Coupler 44, bandpass filter 47, and impedance pad 48 form a coupling circuit which allows the selection of a desired band of frequencies for signal transmission to the desired degree of selectivity for a given application. Again, for example, in television transmissions, the signal bandwidth is at least 6 MHz.

Associated with first appliance 16 is a first power line connector 56 for connecting power supply 18 of first appliance 16, power supply 26 of first power line adapter unit 24, and information signal supplying means 27, namely the circuitry of FIG. 2, to power line 10. In this way, first appliance 16 and first power line adapter unit 24 are powered and information signals from first appliance 16 are conducted through power line adapter unit 24 to power line 10.

In order to prevent the information signals conducted to power line 10 by first power line connector 56 from being shorted by a "bypass" capacitor 58, which is included in first appliance 16 to prevent signal frequencies generated within the first appliance from being "injected" into power line 10 and to which the information signals might otherwise be conducted by first power line connector 56, means are provided for preventing the information signals from first appliance 16 from being conducted to first appliance along first power line connector 56. Such means include, for example for the embodiment of the invention being described, a pair of inductors 60 and 62 placed in "hot" wire 56a and "neutral" wire 56b, respectively, of first power line connector 56 and which present a high impedance path for the signal frequencies of the information signals from information signal transmitting means 27 between power line 10 and "bypass" capacitor 58. Inductors 60 and 62 can be ferrite beads in series from the "hot" and "neutral" connections, respectively, to power line 10 and "bypass" capacitor 58. As an alternative to inductors 60 and 62, a filter network, including the transformer coupler by which the information signals are coupled to power line 10, can be arranged to perform the same function. The objective of any such arrangement is to provide a low impedance path to ground for the undesirable high frequencies which might be generated within first appliance 16 and a high impedance for the frequencies of the information signals so that the information signals are conducted from information signal transmitting means 27 to power line 10.

Associated with second appliance 20 is a second power line connector 64 for connecting power supply 22 of second appliance 20, power supply 42 of second power line adapter unit 40, and information signal receiving means 43, namely the circuitry of FIG. 2, to power line 10. In this way, second appliance 20 and second power line adapter unit 40 are powered and information signals from second appliance 20 are conducted through power line adapter unit 40 to power line 10.

In order to prevent the information signals conducted from power line 10 by second power line connector 64 from being shorted by a "bypass" capacitor 70, which is included in second appliance 20 to prevent signal frequencies generated within the second appliance from being "injected" into power line 10 and to which the information signals might otherwise be conducted by second power line connector 64, means are provided for preventing the information signals from power line 10 from being conducted to second appliance 20 along second power line connector 64. Such means include, for the embodiment of the invention being described, a pair of inductors 66 and 68 placed in "hot" wire 64a and "neutral" wire 64b, respectively, of second power line connector 64 which present a high impedance path for the signal frequencies of the information signals from power line 10 between power line 10 and "bypass" capacitor 70. As with inductors 60 and 62, inductors 66 and 68 can be ferrite beads in series from the "hot" and "neutral" connections, respectively, to power line 10 and "bypass" capacitor 70. Again, as an alternative to inductors 66 and 68, a filter network, including the transformer coupler by which the information signals are coupled from power line 10, can be arranged to perform the same function. The objective of any such arrangement is to provide a low impedance path to ground for the undesirable high frequencies which might be generated within second appliance 20 and a high impedance for the frequencies of the information signals so that the information signals are conducted from power line 10 to information signal receiving means 43.

The operation of the power line communications system illustrated in FIG. 1 will be explained by way of an example in which first appliance 16 is a cable television box and second appliance 20 is a television set. Television signals from the cable television box are conducted through information signal transmitting means 27 and first power line connector 56 to power line 10. The television signals are conducted along power line 10 and through second power line connector 64 and information signal receiving means 43 to the television set.

It will be evident that power line adapter units 24 and 40 each can be arranged to both transmit and receive information signals. For example, power line adapter unit 40, besides receiving television signals from power line 10 which are conducted to a television set (i.e. second appliance 20), can also have information signal transmitting means similar to information signal transmitting means 27, to receive remote control signals (i.e. information signals) from the television set which are conducted by power line adapter unit 40 and second power line connector 64 to power line 10. Such remote control signals are prevented from being shorted by "bypass" capacitor 70 by inductors 66 and 68. Instead, these remote control signals are conducted along power line 10 and first power line connector 56 to power line adapter unit 24, which can also have information signal receiving means, similar to information signal receiving means 43. The remote control signals, in turn, are conducted to a tuner control circuit for channel selection.

While there have been described preferred embodiments of the present invention, it should be obvious to those skilled in the art that various modifications and changes can be made without departing from the true spirit and scope of the invention.

What is claimed:

1. An electrical appliance adapted for conducting information signals to or from the appliance from or to a power line, the electrical appliance comprising at least one of:
   (A) means for conducting information signals to a power line including:
      (1) a source for supplying information signals and having a power supply,
      (2) a power line adapter unit having:
         (a) a power supply, and
         (b) information signal transmitting means for conducting information signals from said source to a power line,
      (3) a power line connector for connecting:
         (a) said power supply of said source,
         (b) said power supply of said power line adapter unit for conducting information signals from said source to a power line, and
         (c) said information signal transmitting means to a power line, and (4) means for preventing information signals from said information signal transmitting means from being conducted to said source along said power line connector; and (B) means for conducting information signals from a power line including:
   (1) a utilization unit for using information signals and having a power supply,
   (2) a power line adapter unit having:
      (a) a power supply, and
      (b) information signal receiving means for conducting information signals from a power line to said utilization unit,
   (3) a power line connector for connecting:
      (a) said power supply of said utilization unit,
      (b) said power supply of said power line adapter for conducting information signals from a power line to said utilization unit, and
      (c) said information signal receiving means to a power line, and
   (4) means for preventing information signals from a power line from being conducted directly from a power line to said utilization unit.

2. An electrical appliance according to claim 1 wherein said means for preventing information signals from said information signal transmitting means from being conducted to said source and said means for preventing information signals from a power line from being conducted directly to said utilization unit each form a high impedance for the frequencies of the information signals.

3. An electrical appliance according to claim 2 wherein:
   (a) each of said power line connectors includes a "hot" wire and a "neutral" wire,
   (b) said means for preventing information signals from said information signal transmitting means from being conducted to said source include a first and second inductors placed in said "hot" wire and said "neutral" wire, respectively, of said power line connector and which present a high impedance path for signal frequencies of the information signals from a power line between a power line and said source, and
   (c) said means for preventing information signals from a power line from being conducted directly to said utilization unit include a first and second inductors placed in said "hot" wire and said "neutral" wire, respectively, of said power line connector and which present a high impedance path for the signal frequencies of the information signals from a power line between a power line and said utilization unit.

4. A power line communications system comprising:
   a power line;
   a first appliance for supplying information signals and having a power supply;
   a first power line adapter unit having:
      (a) a power supply, and
      (b) information signal transmitting means for conducting information signals from said first appliance to said power line;
   a first power line connector for connecting:
      (a) said power supply of said first appliance,
      (b) said power supply of said first power line adapter, and
      (c) said information signal transmitting means to a power line;
   means for preventing information signals from said information signal transmitting means from being conducted to said first appliance along said first power line connector;
   a second appliance for receiving information signals and having a power supply;
   a second power line adapter unit having:
      (a) a power supply, and
      (b) information signal receiving means for conducting information signals from a power line to said second appliance;
   a second power line connector for connecting:
      (a) said power supply of said second appliance,
      (b) said power supply of said second power line adapter, and
      (c) said information signal receiving means to a power line; and
   means for preventing information signals from a power line from being conducted directly from a power line to said second appliance along said second power line connector.

5. An electrical appliance for supplying information signals to a power line comprising:
   a source of information signals having a power supply;
   a power line adapter unit having:
      (a) a power supply, and
      (b) information signal transmitting means for conducting information signals from said source of information signals to power line;
   a power line connector for connecting:
      (a) said power supply of said source of information signals,
      (b) said power supply of said power line adapter unit, and
      (c) said information signal transmitting means to a power line; and
   means for preventing information signals from said information signal transmitting means from being conducted to said source of information signals along said power line connector.

6. An electrical appliance according to claim 5 wherein said means for preventing information signals from said information signal transmitting means from being conducted to said source of information signals along said power line connector form a high impedance for the frequencies of the information signals.

7. An electrical appliance according to claim 6 wherein said power line connector includes a "hot" wire and a "neutral" wire, and said means for preventing information signals from said information signal transmitting means from being conducted to said source of information signals along said power line connector include a first and second inductors placed in said "hot" wire and said "neutral" wire, respectively, of said power line connector and which present a high impedance path for signal frequencies of the information signals from a power line between a power line and said source for supplying information signals.

8. An electrical appliance for receiving information signals from a power line comprising:
   a utilization unit for using information signals and having a power supply;
   a power line adapter unit having:
      (a) a power supply, and
      (b) information signal receiving means for conducting information signals from a power line to said utilization unit for using information signals;
   a power line connector for connecting:
      (a) said power supply of said utilization unit for using information signals, (b) said power supply of said power line adapter unit, and (c) said information signal receiving means to a power line; and means for preventing information signals from a power line from being conducted directly from a power line to said utilization unit for using information signals along said power line connector.

9. An electrical appliance according to claim 8 wherein said means for preventing information signals from a power line from being conducted directly from a power line to said utilization unit for using information signals along said power line connector form a high impedance for the frequencies of the information signals.

10. An electrical appliance according to claim 9 wherein said power line connector includes a "hot" wire and a "neutral" wire, and said means for preventing information signals from a power line from being conducted directly from a power to said utilization unit for using information signals along said power line connector include first and second inductors placed in said "hot" wire and said "neutral" wire, respectively, of said power line connector and which present a high impedance path for signal frequencies of the information signals from a power line between a power line and said utilization unit for using information signals.

* * * * *